US008804592B2

(12) United States Patent
Kim et al.

(10) Patent No.: US 8,804,592 B2
(45) Date of Patent: Aug. 12, 2014

(54) METHOD AND DEVICE FOR MANAGING OF MULTICAST AND BROADCAST SERVICE

(75) Inventors: Jung-Im Kim, Daejeon (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 290 days.

(21) Appl. No.: 13/062,331

(22) PCT Filed: Sep. 4, 2009

(86) PCT No.: PCT/KR2009/005016
§ 371 (c)(1),
(2), (4) Date: Mar. 4, 2011

(87) PCT Pub. No.: WO2010/027215
PCT Pub. Date: Mar. 11, 2010

(65) Prior Publication Data
US 2011/0194480 A1   Aug. 11, 2011

(30) Foreign Application Priority Data

Sep. 5, 2008 (KR) .................. 10-2008-0087916
Aug. 11, 2009 (KR) .................. 10-2009-0073939

(51) Int. Cl.
*H04H 20/71* (2008.01)
(52) U.S. Cl.
USPC ........... 370/312; 370/216; 370/310; 370/329; 380/278
(58) Field of Classification Search
USPC ........... 370/312, 216, 310, 336, 329; 380/278
See application file for complete search history.

(56) References Cited

U.S. PATENT DOCUMENTS

| 2005/0083913 | A1* | 4/2005 | Choi et al. ............... 370/352 |
| 2008/0045224 | A1 | 2/2008 | Lu et al. |
| 2010/0080159 | A1 | 4/2010 | Hu et al. |

FOREIGN PATENT DOCUMENTS

| WO | 2005/018268 A1 | 2/2005 |
| WO | 2006/104335 A2 | 10/2006 |
| WO | 2007/148933 A1 | 12/2007 |
| WO | WO 2007148933 A1 * | 12/2007 |
| WO | 2008/023928 A2 | 2/2008 |
| WO | 2008/024214 A2 | 2/2008 |
| WO | WO 2008023928 A2 * | 2/2008 |
| WO | WO 2008024214 A2 * | 2/2008 |
| WO | 2008/025239 A1 | 3/2008 |
| WO | WO 2008025239 A1 * | 3/2008 |
| WO | 2009/022882 A2 | 2/2009 |

OTHER PUBLICATIONS

Dahlman, Erik et al., "3G Evolution, HSPA and LTe for Mobile Broadband," 1st Edition, Academic Press, pp. 248, 249 and 384 (2007).
International Search Report and Written Opinion for Application No. PCT/KR2009/005016, 44 pages, dated Mar. 2, 2012.

* cited by examiner

*Primary Examiner* — Andrew Lai
*Assistant Examiner* — Jamaal Henson
(74) *Attorney, Agent, or Firm* — Nelson Mullins Riley & Scarborough LLP

(57) ABSTRACT

A method for managing a multicast and broadcast service in a base station according to an embodiment of the present invention includes: transmitting a multicast and broadcast service control channel to a terminal; transmitting an indicator channel for indicating a change of the multicast and broadcast service control channel by using a unicast control channel when the multicast and broadcast service control channel is changed, to the terminal; and transmitting the changed multicast and broadcast service control channel to the terminal.

14 Claims, 2 Drawing Sheets

METHOD AND DEVICE FOR MANAGING OF MULTICAST AND BROADCAST SERVICE

RELATED APPLICATIONS

This application is a 35 U.S.C. §371 national stage filing of PCT Application No. PCT/KR2009/005016 filed on Sep. 4, 2009, which claims priority to, and the benefit of, Korean Patent Application No. 10-2008-0087916 filed Sep. 5, 2008 and Korean Patent Application No. 10-2009-0073939 filed Aug. 11, 2009. The contents of the aforementioned applications are hereby incorporated by reference.

TECHNICAL FIELD

The present invention relates to a method and a device for managing a multicast and broadcast service.

BACKGROUND ART

A mobile communication service can be classified into a unicast service and a multicast and broadcast service (MBS).

The unicast service is a point-to-point service that transmits data to one recipient from one source. Terminals perform the service by using different wireless resources.

The multicast and broadcast service is a point-to-multipoint service that transmits data to multiple recipients from one source. In this service, the multiple recipients use a common resource so as to efficiently use resources. The multiple recipients can share a connection ID of a packet so as to use the common resource.

Meanwhile, in order to reduce power consumption of the terminal, the state of the terminal is administrated by dividing a connected state and an idle state. In the unicast service, the terminal can receive the service when the terminal is in the connected state, and minimizes power consumption without receiving the unicast service when the terminal is in the idle state. In the case of the multicast and broadcast service, the terminal can receive the service when the terminal is in both the connected state and the idle state, and the terminal performs transmission of a service control channel by a method for reducing power consumption in the idle state.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method and a device for managing a multicast and broadcast service having advantages of efficiently receiving a service control channel in the multicast and broadcast service and preventing a base station from unnecessarily performing the multicast and broadcast service.

Solution to Problem

An exemplary embodiment of the present invention provides a method for managing of a multicast and broadcast service in a base station, that includes: transmitting a multicast and broadcast service control channel to a terminal; transmitting an indicator channel for indicating a change of the multicast and broadcast service control channel by using a unicast control channel when the multicast and broadcast service control channel is changed, to the terminal; and transmitting the changed multicast and broadcast service control channel to the terminal.

The method may further include allocating an identifier included in the unicast control channel as a service identifier for each multicast and broadcast service.

The size of the service identifier may be the same as the size of the identifier included in the unicast control channel.

Another embodiment of the present invention provides a method for managing a multicast and broadcast service in a base station, that includes: transmitting an indicator channel for inquiring of an intention to receive the multicast and broadcast service to a terminal; receiving a response to the inquiry of intention to receive the service from the terminal; and transmitting the multicast and broadcast service control channel to the responding terminal.

The indicator channel may be a unicast control channel.

The terminal may include a terminal that is in a connected state.

The indicator channel may include uplink information, and the base station may receive the response that the terminal that is in the connected state gives to the inquiry on intention to receive the service by using the uplink information.

The method may further include counting the number of responding terminals that are in the connected state.

The method may further include, when the number of responding terminals that are in the connected state is smaller than a predetermined number as the counting result, transmitting an indicator channel for inquiring of the intention to receive the multicast and broadcast service to a terminal that is in an idle state.

The method may further include counting the number of responding terminals that are the idle state.

The method may further include transmitting the service control channel to each of the responding terminals that are in the idle state and the responding terminals that are in the connected state.

Yet another embodiment of the present invention provides a device for managing a multicast and broadcast service, that includes: a service control channel transmitter that transmits a multicast and broadcast service control channel to a terminal; and an indicator channel transmitter that transmits a first indicator channel for indicating a change of the multicast and broadcast service control channel by using a unicast control channel when the multicast and broadcast service control channel is changed.

The indicator channel transmitter may transmit a second indicator channel for inquiring of an intention to receive the service to the terminal.

The service control channel transmitter may transmit the multicast and broadcast service control channel to the terminal that responds to the inquiry on intention to receive the service.

It is possible to count the number of terminals that respond to the inquiry on intention to receive the service.

Advantageous Effects of Invention

According to an embodiment of the present invention, in a multicast and broadcast service, a terminal can efficiently receive a service control channel, and it is possible to prevent a base station from unnecessarily performing the multicast and broadcast service.

MODE FOR THE INVENTION

Figure 1:
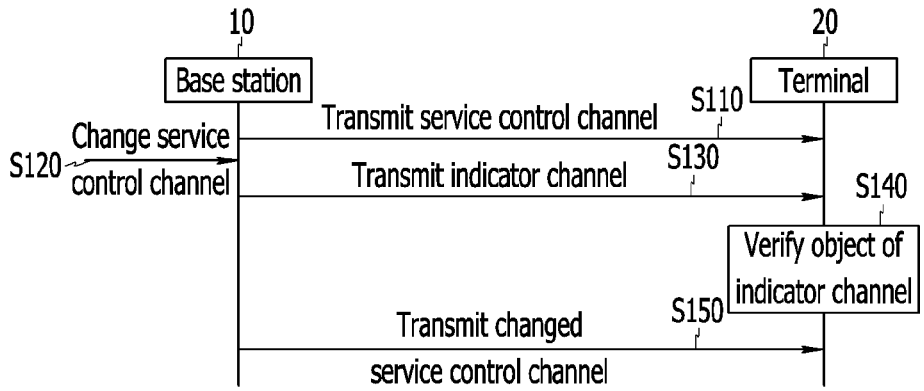
FIG. 1 is a flowchart illustrating a method for managing a multicast and broadcast service according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

In the specification, a terminal may designate a mobile station (MS), a mobile terminal (MT), a subscriber station (SS), a portable subscriber station (PSS), user equipment (UE), an access terminal (AT), etc., and may include the entire or partial functions of the terminal, the mobile terminal, the subscriber station, the portable subscriber station, the user equipment, the access terminal, etc.

In the specification, a base station (BS) may designate an access point (AP), a radio access station (RAS), a node B, an evolved node B (eNodeB), a base transceiver station (BTS), a mobile multihop relay (MMR)-BS, etc., and may include the entire or partial functions of the access point, the radio access station, the node B, the evolved node B, the base transceiver station, the MMR-BS, etc.

Hereinafter, a method for managing a multicast and broadcast service according to an embodiment of the present invention will be described in detail with reference to the accompanying drawings.

FIG. 1 is a flowchart illustrating a method for managing a multicast and broadcast service according to an embodiment of the present invention.

Referring to FIG. 1, a base station 10 performs the multicast and broadcast service by transmitting a service control channel to a terminal 20 (S110). In the meantime, the service control channel may be changed (S120).

In this case, the base station 10 transmits an indicator channel to the terminal 20 (S130). At this time, the indicator channel indicates a change of the service control channel, and prevents the terminal 20 from frequently and repeatedly receiving the service control channel against the change of the service control channel and allows the terminal 20 to receive the service control channel only when it is necessary to receive the service control channel. The indicator channel uses a unicast L1/L2 control channel (hereinafter referred to as "unicast control channel") used for scheduling, etc., in a unicast. The unicast control channel is used as the service control channel in the unicast service. The unicast control channel is processed in a physical (PHY) layer of the terminal 20, such that the processing speed is fast.

The unicast control channel includes an identifier of the terminal 20, and the indicator channel uniquely allocates the identifier used in the unicast control channel for each multicast and broadcast service. The size of the identifier is a predetermined size that is accepted in the unicast control channel. When the size of the service control channel is changed, the identifier of the unicast control channel can indicate the changed size.

The terminal 20 verifies the object of the indicator channel by receiving the indicator channel (S140). That is, the terminal 20 determines that the object of the indicator channel is to indicate the change of the service control channel by verifying the identifier of the unicast control channel used as the indicator channel.

The base station 10 transmits the changed service control channel (S150) a predetermined time after transmitting the indicator channel (S130). The terminal 20 receives the changed service control channel after verifying the object of the received indicator channel (S140).

As described above, when the indicator channel is transmitted by using the existing unicast control channel without providing an additional channel for the indicator channel, it is possible to efficiently use resources. Further, since the unicast control channel is processed in the physical layer, the unicast control channel can be rapidly processed, such that the terminal can efficiently receive the service control channel.

Hereinafter, a method for managing a multicast and broadcast service according to another embodiment of the present invention will be described in detail with reference to FIG. 2.

Figure 2:
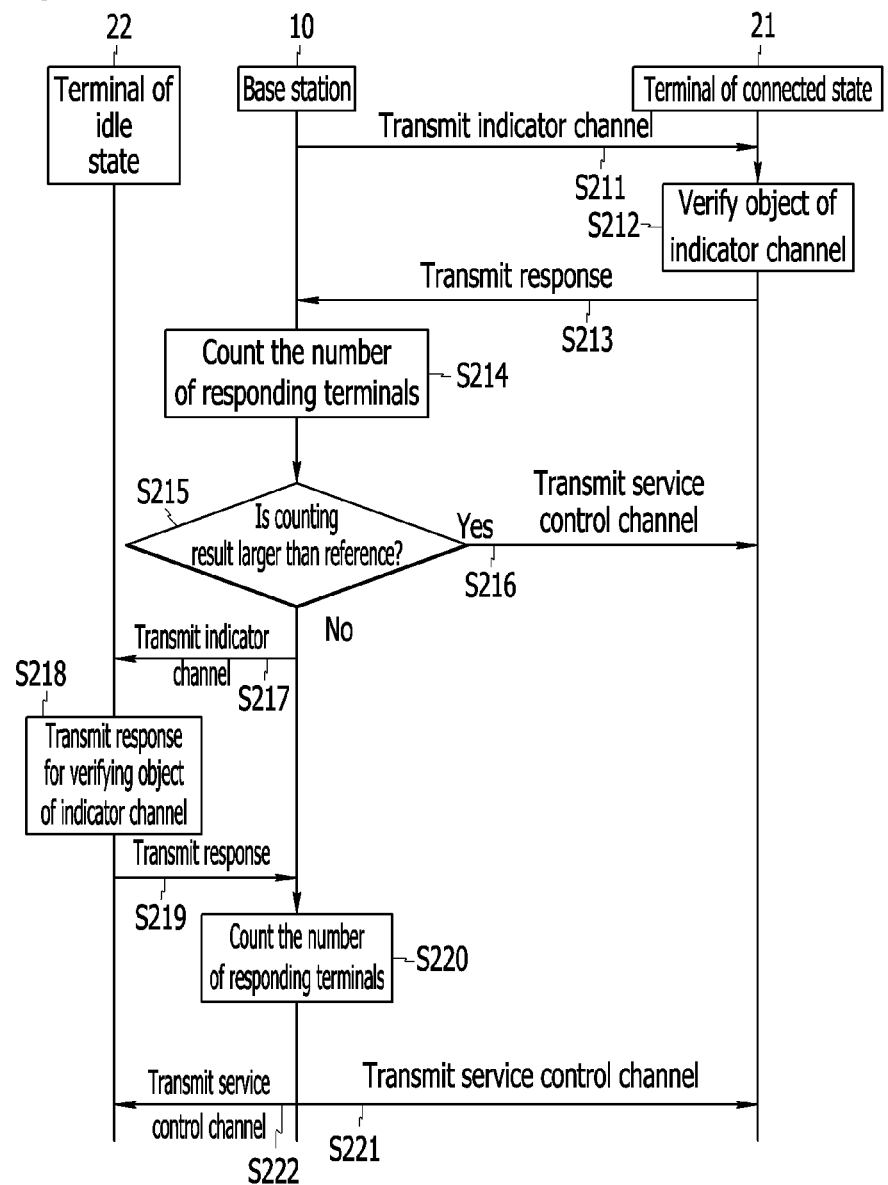
FIG. 2 is a flowchart illustrating a method for managing a multicast and broadcast service according to another embodiment of the present invention.

FIG. 2 is a flowchart illustrating a method for managing a multicast and broadcast service according to another embodiment of the present invention.

Referring to FIG. 2, a base station 10 transmits an indicator channel to a terminal 21 that is in a connected state before starting the multicast and broadcast service (S211). Herein, the indicator channel inquires whether the terminal 21 intends to receive the multicast and broadcast service, and uses a unicast control channel as in the embodiment of FIG. 1. The unicast control channel includes positional information of a wireless resource, that is, uplink information, so that the terminal 21 can transmit and receive data by using the wireless resource.

The terminal 21 verifies the object of the indicator channel by receiving the indicator channel (S212). That is, the terminal 21 verifies whether or not the indicator channel inquires regarding an intention to receive the multicast and broadcast service.

Thereafter, when the terminal 21 intends to receive the multicast and broadcast service, the terminal 21 transmits a response to the intention to the base station 10 (S213). At this time, the response of the terminal 21 is transmitted by the uplink information transmitted while being included in the indicator channel in advance.

The base station 10 counts the number of terminals that respond to the inquiry on intention to receive the service from a plurality of terminals that are in the connected state, like the terminal 21 (S214).

When the counting result is larger than a predetermined reference, the base station 10 provides the multicast and broadcast service to the terminal 21 by transmitting the service control channel to the terminal 21 that responds the intention to receive the service (S216).

When the counting result is equal to or less than the predetermined reference, the base station 10 transmits the indicator channel to a terminal 22 that is in an idle state (S217). The terminal 22 verifies whether the object of the indicator channel is to inquire on the intention to receive the service by receiving the indicator channel (S218). Thereafter, when the terminal 22 intends to receive the service, the terminal 22 transmits a response to the intention to the base station 10 (S219). At this time, the response of the terminal 22 can be performed by using the channel that can be used in the idle state, for example, a ranging channel or a random access channel.

The base station 10 counts the number of terminals that respond to the inquiry on intention to receive the service from a plurality of terminals that are in the idle state, like the terminal 22 (S220). After counting, the base station 10 starts to perform the multicast and broadcast service by transmitting the service control channel to each of the terminals 21 and 22.

If there is no terminal that responds the intention as the counting result, the base station 10 may not perform the multicast and broadcast service.

As such, since the base station 10 starts the service after verifying whether or not the terminal that intends to receive the service is provided, it is possible to prevent the data from being transmitted when it is unnecessary to perform the service. Further, a service priority for the terminal 22 that is in the idle state can be granted to the terminal 21 that is in the connected state.

Hereinafter, a method for managing of a multicast and broadcast service according to yet another embodiment of the present invention will be described in detail with reference to FIG. 3.

Figure 3:
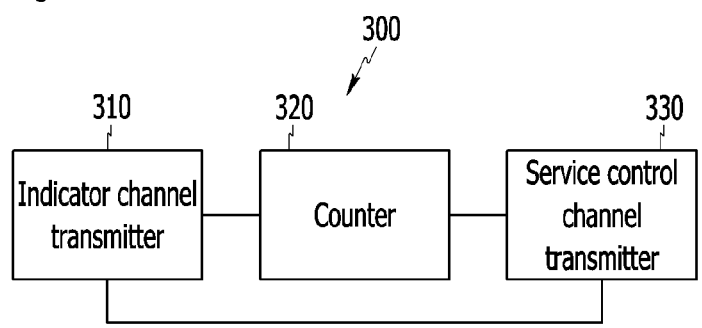
FIG. 3 is a schematic block diagram of a device for managing a multicast and broadcast service according to yet another embodiment of the present invention.

FIG. 3 is a schematic block diagram of a device for managing a multicast and broadcast service according to an embodiment of the present invention.

Referring to FIG. 3, the multicast and broadcast service managing device 300 is mainly included in a base station 10, and includes an indicator channel transmitter 310, a counter 320, and a service control channel transmitter 330.

When a service control channel is changed, the indicator channel transmitter 310 transmits an indicator channel for indicating the change of the service control channel to a terminal 20, or transmits an indicator channel for inquiring of an intention to receive a service to terminals 21 and 22. The indicator channel transmitted in the indicator channel transmitter 310 is a unicast control channel.

When the indicator channel transmitter 310 inquires whether the terminals 21 and 22 intend to receive the service, the counter 320 counts the number of terminals 21 and 22 that respond to the inquiry.

The service control channel transmitter 330 transmits the multicast and broadcast service control channel to the terminals 20, 21, and 22. At this time, the service control channel transmitter 330 indicates the change of the service control channel through the indicator channel to the terminal 20, and can transmit the changed service control channel after a predetermined time. Further, after the service control channel transmitter 330 transmits the indicator channel for inquiring of the intention to receive the service to the terminals 21 and 22, the service control channel transmitter 330 can transmit the service control channel to the terminals 21 and 22 depending on a result of counting the number of terminals 21 and 22 that respond to the inquiry.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for managing a multicast and broadcast service in a base station, comprising:
   transmitting a multicast and broadcast service control channel to a terminal;
   transmitting an indicator channel for indicating a change of the multicast and broadcast service control channel by using a unicast control channel when the multicast and broadcast service control channel is changed, to the terminal, wherein the unicast control channel includes an identifier to indicate a change in size of the multicast and broadcast service control channel; and
   transmitting the changed multicast and broadcast service control channel to the terminal,
   wherein the base station counts a number of terminals in a connected state that respond to an inquiry of intention to receive the multicast and broadcast service,
   wherein when the counted number is larger than a predetermined reference, the base station provides the multicast and broadcast service to the terminals, and when the counted number is equal to or less than the predetermined reference, the base station transmits the indicator channel to a terminal in an idle state and counts a number of terminals in the idle state that respond to the inquiry.

2. The method of claim 1, further comprising allocating an identifier comprised in the unicast control channel as a service identifier for each multicast and broadcast service.

3. The method of claim 2, wherein the size of the service identifier is the same as the size of the identifier comprised in the unicast control channel.

4. A method for managing a multicast and broadcast service in a base station, comprising:
   transmitting an indicator channel for inquiring of an intention to receive the multicast and broadcast service to a terminal;
   receiving a response to an inquiry of intention to receive the service from the terminal: and
   transmitting the multicast and broadcast service control channel to the responding terminal,
   wherein the base station counts a number of terminals in a connected state that respond to the inquiry,
   wherein when the counted number is larger than a predetermined reference, the base station provides the multicast and broadcast service to the terminals, and when the counted number is equal to or less than the predetermined reference, the base station transmits the indicator channel to terminals in an idle state and counts a number of terminals in the idle state that respond to the inquiry,
   wherein the indicator channel comprises a unicast control channel that includes an identifier to indicate a change in size of the multicast and broadcast service control channel.

5. The method of claim 4, wherein the terminal comprises a terminal that is in a connected state.

6. The method of claim 5, wherein the indicator channel comprises uplink information, and the base station receives the response that the terminal that is in the connected state performs the inquiry of intention to receive the service by using the uplink information.

7. The method of claim 5, further comprising counting the number of responding terminals that are in the connected state.

8. The method of claim 7, further comprising, when the number of responding terminals that are in the connected state is smaller than a predetermined number as the counting result, transmitting an indicator channel for inquiring of the intention to receive the multicast and broadcast service to a terminal that is in an idle state.

9. The method of claim 8, further comprising counting the number of responding terminals that are the idle state.

10. The method of claim 9, further comprising transmitting the service control channel to each of the responding terminals that are in the idle state and the responding terminals that are in the connected state.

11. A device for managing a multicast and broadcast service, comprising:
 a service control channel transmitter that transmits a multicast and broadcast service control channel to a terminal; and
 an indicator channel transmitter that transmits a first indicator channel for indicating a change of the multicast and broadcast service control channel by using a unicast control channel when the multicast and broadcast service control channel is changed, wherein the unicast control channel includes an identifier to indicate a change in size of the multicast and broadcast service control channel,
 wherein the base station counts a number of terminals in a connected state that respond to an inquiry of intention to receive the service,
 wherein when the counted number is larger than a predetermined reference, the base station provides the multicast and broadcast service to the terminals, and when the counted number is equal to or less than the predetermined reference, the base station transmits the indicator channel to terminals in an idle state and counts a number of terminals in the idle state that respond to the inquiry.

12. The device of claim 11, wherein the indicator channel transmitter transmits a second indicator channel for inquiring of an intention to receive the service to the terminal.

13. The device of claim 12, wherein the service control channel transmitter transmits the multicast and broadcast service control channel to the terminal that responds to the inquiry of intention to receive the service.

14. The device of claim 12, further comprising a counter that counts the number of terminals that respond to the inquiry of intention to receive the service.

* * * * *